United States Patent [19]

Takahashi et al.

[11] Patent Number: 5,422,061
[45] Date of Patent: Jun. 6, 1995

[54] METHOD OF INJECTION MOLDING ULTRA-HIGH MOLECULAR WEIGHT POLYETHYLENE SLIDING MEMBERS

[75] Inventors: Tatsumi Takahashi; Hideaki Fujii; Masashi Nishiyama, all of Tokyo, Japan

[73] Assignee: Dai Nippon Insatsu Kabushiki Kaisha, Tokyo, Japan

[21] Appl. No.: 137,731

[22] Filed: Oct. 18, 1993

Related U.S. Application Data

[63] Continuation of Ser. No. 490,596, May 25, 1990, abandoned.

[30] Foreign Application Priority Data

Sep. 28, 1988 [JP] Japan .................. 63-243496
Mar. 16, 1989 [JP] Japan .................. 1-64267
Apr. 18, 1989 [JP] Japan .................. 1-99675
Jun. 26, 1989 [JP] Japan .................. 1-164858

[51] Int. Cl.⁶ .................. B29C 45/34; B29C 45/56
[52] U.S. Cl. .................. 264/571; 264/102; 264/328.1
[58] Field of Search .......... 264/571, 101, 102, 328.1, 264/328.7, 328.12, 328.11; 425/546; 525/240

[56] References Cited

U.S. PATENT DOCUMENTS

| | | |
|---|---|---|
| 2,471,148 | 5/1949 | Gale . |
| 2,999,273 | 9/1961 | Gronemeyer et al. . |
| 4,451,633 | 5/1984 | Brownscombe et al. ......... 264/328.1 |
| 4,540,534 | 9/1985 | Grendol ............ 264/328.7 |

FOREIGN PATENT DOCUMENTS

| | | |
|---|---|---|
| 0042768 | 12/1981 | European Pat. Off. . |
| 0274536 | 7/1988 | European Pat. Off. . |
| 0315481 | 5/1989 | European Pat. Off. . |
| 0402484 | 12/1990 | European Pat. Off. . |
| 51-81861 | 7/1976 | Japan . |
| 57-169335 | 10/1982 | Japan . |
| 59-120423 | 7/1984 | Japan . |
| 59-194841 | 11/1984 | Japan . |
| 60-9723 | 1/1985 | Japan . |
| 407535 | 8/1966 | Switzerland . |
| 2050928 | 1/1981 | United Kingdom . |
| 2175909 | 12/1986 | United Kingdom . |

OTHER PUBLICATIONS

DatabaseWPIL, No. 84-209493(34), Derwent Publications Ltd., London, GB; & JP-A-59120423 (Nitto Electric Ind. K. K.) 12 Jul. 1984.

DatabaseWPIL, No. 84-0202508(04), Derwent Publications Ltd., London, GB; & JP∝A-58210929 (Nitto Electric Ind. K. K.) 8 Dec. 1983.

Patent Abstracts of Japan, vol. 9, No. 124 (M-383)[1847], 29 May 1985; & JP-A-609723(Dai Nippon Insatsu K. K.) 18 Jan. 1985.

Patent Abstracts of Japan, vol. 11, No. 289 (M-625)[2736], 18 Sep. 1987; & JP-A-6283122 (Dai Nippon Printing Co., Ltd.) 16 Apr. 1987.

*Primary Examiner*—Jill L. Heitbrink
*Attorney, Agent, or Firm*—Foley & Lardner

[57] ABSTRACT

The present invention relates to a sliding member formed of a synthetic resin composed mainly of a polyethylene, said sliding member comprising a molded piece of a polyethylene having a viscosity-average molecular weight of 500,000 to 6,000,000 inclusive, having a low coefficient of friction and excelling in both its own wear resistance and its property of preventing the abrasion of an associated member.

21 Claims, 7 Drawing Sheets

[WEAR RESISTANCE OF UHMW-PE AND SK STEEL (SAND SLURRY TEST, SiC = 16, 1,500 rpm)]

METHOD OF INJECTION MOLDING ULTRA-HIGH MOLECULAR WEIGHT POLYETHYLENE SLIDING MEMBERS

This application is a continuation of U.S. application Ser. No. 07/490,596 filed May 25, 1990, now abandoned.

TECHNICAL FIELD

The present invention relates to a sliding member of synthetic resins and, more particularly, to a tape guide used with magnetic tapes for VTR, sound recording and digital recording, and the like.

BACKGROUND ART

Heretofore, various materials have been used for guides for movable systems for magnetic tapes such as VTR and cassette tapes. For instance, known organic materials involve polyoxymethylene (POM for short) which are used alone or in combination with a fluororesin and even silicon. Some plastic parts contain carbon so as to release charges generated by frictional contact with the surface of a tape, since plastics tend to be electrified. Known inorganic materials include metals and ceramics, while known metallic guides are formed of stainless materials or brass plated on its surface with nickel or chromium.

Such guides as mentioned above operate in two manners, according to one of which they rotate in association with the travelling of a tape. According to another, they are fixed relative to the travelling of a tape. In most cases, the fixed type of metallic guides are used for portions through which a tape travels under relatively increased tape tension with increased changes in the direction of its movement.

Some problems with such conventional guides originate from the properties of the materials used and some arise from the processing techniques applied.

Of noteworthy in connection with the materials used is that in view of the principles of friction or tribology, a material of larger momentum should basically be harder than its associated material of smaller momentum. In other words, a tape's material should fundamentally be harder than its associated guide. Under such conditions, the amount of abrasion is considered to be minimized.

In view of tribology, however, the material used for the conventional guides is totally reversed in combination or not in ideal conditions at all. More specifically, the POM that is a polymeric material used for guides is much harder than PET that is a base film of magnetic tapes. In addition, stainless or chromium-plated brass materials used for fixed guides are harder than the POM. This implies that if guides become irregular even slightly on their surfaces, then magnetic tapes will be likely to be damaged.

To avoid this problem, the surfaces of guides over which tapes travel, i.e., in contact with them, are now polished into mirror surfaces to increase the area of their surfaces in contact with the tapes, thereby applying local contact pressure to the tapes for the purpose of preventing the travelling resistance from increasing and so the surfaces of the tapes from being damaged. More illustratively, the guides are polished to such a surface roughness as expressed in terms of Rmax equal to or less than 0.1 μm.

For the rotary guides, on the other hand, a roundness of 0.1 μm or below is required in addition to having such a surface roughness as mentioned.

Thus, a problem with the conventional guides is that as a result of unavoidably making no account of the basic principles of tribology in view of some limitations placed on materials, it is required to increase their accuracy of processing to the highest level now achievable, leading to increases in product costs. In the case of the fixed type of guides in particular, it is still impossible to make them of plastics. Thus, metallic guides are still forcibly used even for cassette cases or decks, imposing considerable limitations on making them light, mass-producing them and cutting down their costs.

DISCLOSURE OF THE INVENTION

As a result of various studies made by the present inventors so as to provide a solution to the above problems, it has now been found that a sliding material formed of a polyethylene resin having a relatively high molecular weight on the order of 500,000 to 6,000,000 can meet the basic principles of tribology, as already mentioned, and can be mass-produced at lower costs by making a high-molecular weight polyethylene injection-moldable, which has heretofore been considered difficult-to-mold. Such findings underlie the present invention.

More specifically, the present invention provides a sliding member of a synthetic resin containing a polyethylene as a main component, which is characterized by being formed of an injection-molded piece or part of a polyethylene having a molecular weight of 500,000 to 6,000,000 inclusive, being decreased in its coefficient of friction and excelling in both its own resistance to abrasion and its property of preventing the abrasion of an associated member.

BEST MODE FOR CARRYING OUT THE INVENTION

In what follows, the sliding member of the present invention will be explained with reference to a guide for magnetic tapes as an example.

Figure 1:
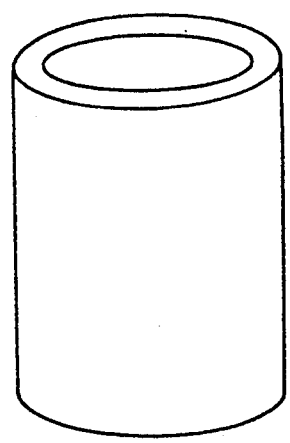
FIG. 1 is a general view of a guide for magnetic tapes according to the present invention.

Generally, the guide for guiding a magnetic tape according to the present invention is in such a form as illustrated in FIG. 1, e.g., in a cylindrical form of about 6 mm in outer diameter, about 4.85 mm in inner diameter and about 16 mm in length. This example is applicable to a ½-inch magnetic tape. It is to be understood, however, that the outer and inner diameters and length of guides may vary depending upon the width of tapes and even the structure of cassette cases.

It is also understood that the guide is not limited to such a cylindrical form and may be in any form best-suited for tapes to pass over it, such as a combined form having curved and flat surfaces. Basically, however, it is suitable that the guide is in a columnar form which may be of any desired section.

The material used for the guide according to the present invention is a polyethylene having a molecular weight of 500,000 to 6,000,000 inclusive. A preferable molecular-weight range is between 600,000 and 2,000,000. As a result of the analysis of the results of tribological measurement of the surface of a polyester film that is a material of magnetic tapes and a polyethylene guide, the present inventors have now found that the polyethylene is worn down by the polyester in a molecular weight less than 500,000, whereas the polyester film is worn down in a molecular weight higher than 6,000,000.

In other words, if the molecular weight is in the above-defined range, then it is possible to obtain a guide which successfully meets three requirements of (a) having a reduced coefficient of friction, (b) having increased abrasion resistance and (c) reducing the abrasion of an associated member (e.g., a polyester film) in a well-harmonized state.

Usually, sliding members such as guides pose an electrification problem due to friction in addition to such friction and abrasion problems as mentioned above. Explaining this referring to the above example, the polarization of charges takes place on the surfaces of both the polyethylene and the associated polyester, since they are independently good insulators. For that reason, attraction by charge occurs between the polyester film and the polyethylene guide, actually leading to a phenomenon that the film sticks to the guide.

This problem is effectively solved by the incorporation of suitable additives. More illustratively, this is achievable by making polyethylene composite with electrically conductive materials such as carbon, gold, silver, aluminium, copper, chromium, nickel, iron, lead, molybdenum, zinc, tin, indium, bismuth, platinum, selenium, magnesium, manganese, cobalt, tungsten, titanium, germanium, mercury and so on. In view of economical considerations and electrical properties, particular preference is given to carbon, silver, gold, aluminium, copper, iron, zinc and nickel which may be used alone or in combination of two or more. The electrically conductive materials should be added in an amount of preferably 0.1 to 20% by weight, more preferably 1 to 8% by weight.

More preferably, organic additives may be added in order to improve the sliding properties of the polyethylene guide with respect to the associated polyester film.

Detailed experimentation has revealed that the addition of a hydrocarbonaceous oligomer having a number-average molecular weight of 400 to 4000, e.g., ethylene-α-olefin oligomer is much more effective for improvements in the sliding properties. The amount of the hydrocarbonaceous oligomer added should be in a range of 0.1 to 20% by weight, preferably 3 to 10% by weight.

It is noted that the organic material to be added to polyethylene is not limited to one type. Much more improved sliding properties are obtainable by the addition of any organic materials in combination of two or more depending upon what properties are required for the passing of tapes. As an example, a combination of a polyethylene having an ultrahigh-molecular weight higher than 2,000,000 with additives, say, 5% by weight of carbon, 1% by weight of polyethylene wax and 5% by weight of a hydrocarbonaceous oligomer provides sliding properties fit for a guide for conventional VTR tapes.

Another example of the organic additives according to the present invention is a surface active agent based on fluorine.

The fluorine base surfactants may include anionic ones such as ammonium salts of perfluoroalkyl sulfonic acids, potassium salts of perfluoroalkyl sulfonic acids and potassium salts of perfluoroalkyl carboxylic acids; cationic ones such as iodides of perfluoroalkyl quaternary ammonium; and nonionic ones such as perfluroalkyl polyoxyethylene ethanol and fluoroalkyl esters. They are all effective for improvements in the sliding properties between the polyester film and the polyethylene. Among others, the anionic surfactants based on fluorine are most effective, probably because of the anionic, cationic and nonionic systems, the anionic ones are so low in the compatibility in polyethylene that they can bleed out onto the surfaces of molded pieces even in slight amounts. The fluorine base surfactants should be added in an amount of preferably 0.01 to 5% by weight, more preferably 0.1 to 1% by weight.

For their uniform dispersion at the time of mixing, it is desired that said fluorine base surfactants, either in powdery forms or in viscous liquid forms, be dissolved in and diluted to a low concentration with an organic solvent which can be evaporated off at relatively low temperatures and in which they are soluble such as, for instance, methanol, ethanol, isopropyl alcohol, acetone and methyl ethyl ketone. The resulting solution is further atomized with a spray at the time of mixing, thereby making it possible to disperse it uniformly throughout polyethylene.

It is noted that the organic material to be added to polyethylene is not limited to one type. Much more improved sliding properties are obtainable by the addition of any organic materials in combination of two or more depending upon what properties are required for the passing of tapes. As an example, a combination of a polyethylene having an ultra high-molecular weight higher than 2,000,000 with additives, say, 5% by weight of carbon, 5% by weight of the hydrocarbonaceous oligomer and 0.2% by weight of the anionic fluorine base surfactant provides sliding properties fit for a guide for conventional VTR tapes.

Still another example of the organic additives according to the present invention is finely divided tetrafluoroethylene or a fluororesin having a mean particle size of 5 to 20 μm, which is again found to be most effective for improvements in sliding properties. The fluororesin powders should be added in an amount of preferably 0.1 to 50% by weight, more preferably 5 to 25% by weight.

It is noted that the organic material to be added to polyethylene is not limited to one type. Much more improved sliding properties are obtainable by the addition of any organic materials in combination of two or more depending upon what properties are required for the passing of tapes. As an example, a combination of a polyethylene having an ultrahigh-molecular weight higher than 2,000,000 with additives, say, 5% by weight of carbon, 5% by weight of the hydrocarbonaceous oligomer and 15% by weight of the fluororesin powders having a mean particle size of 13 μm provides sliding properties fit for a guide for conventional VTR tapes.

Under the conditions under which guides are to be used, improvements in heat resistance and rigidity may be taken in account. Polyethylene may then be made composite with not only the above electrically conductive materials but also ceramic materials. The ceramic materials used may include those based on aluminium oxide, zirconia, calcium, silicone, silicon and so on. Polyethylene made composite with short carbon and Kepler fibers, etc. may again be effective. These materials should be added in an amount of 0.1 to 20% by weight, preferably 1 to 10% by weight.

For how to make the above electrically conductive and reinforcing materials composite with polyethylene, there is used a system in which they are fast agitated together at a temperature just below the melting temperature of the polyethylene resin employed to make use of the heat generated by the friction between the resin and the additives. Stirring is carried out in an inert gas atmosphere to avoid a reduction in the molecular weight of the polyethylene by its oxidation. It is suitable that the polyethylene resin used has a particle size of 10 to 300 μm, preferably 50 to 200 μm, whereas the additives used have a particle size of 0.01 to 100 μm, preferably 0.05 to 10 μm.

The powders of the polyethylene and additives are first agitated at high speeds in an inert gas. Stirring is carried out at an initial chamber temperature of 60° C., while rotating an agitating blade at 100 to 10,000 rpm, preferably 300 to 3,000 rpm, and is then continued until a temperature of 80° to 120° C. is reached by frictional heat generation.

According to the findings of the present inventors, the additives adhere closely to the surfaces of the polyethylene particles under the above conditions, so that improvements can be introduced in electrical conductivity and strength even in small amounts at the time of mixing. One means for meeting the above conditions is preferably a Henschel mixer.

Processing the thus treated polyethylene resin into a guide form is achieved by using the injection-molding technique provided by the invention of the present inventors, which will be described later.

For molds for obtaining the molded guides according to the present invention, use may be made of vacuum/compression molds to be described later.

Figure 2:
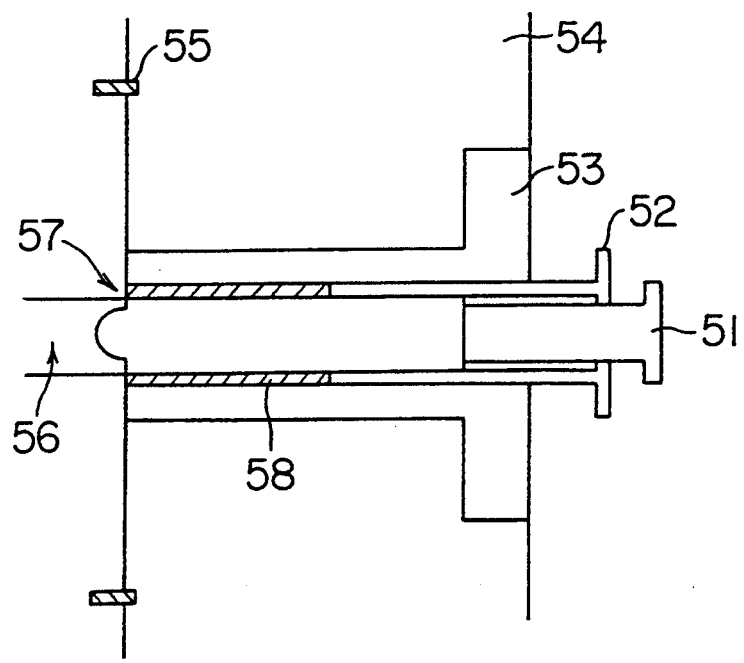
FIG. 2 is a sectional view showing part of a mold used in the present invention, FIGS. 3–4 and 6–8 each are a sectional view of an injection-molding machine used in the present invention.

One typical basic structure of the mold used, which will be described in detail, is shown in FIG. 2, wherein reference numeral 51 stands for a core pin, 52 a sleeve (for an ejector), 53 a cavity, 54 a cavity plate, 55 a seal ring, 56 a secondary sprue, 57 a film gate and 58 a molded piece or part.

As an example, the molded piece is in the form of such a cylindrical guide as depicted in FIG. 1. The cavity space, in which the composite polyethylene resin according to the present invention is to be filled, is vacuumized through a parting line of the mold. For vacuumization, a vacuum pump is used, which connects with a pipeline arranged externally of the mold. After filling, the resin is compressed by moving the sleeve 52 horizontally (on the drawing). Effectively, the sleeve 52 is actuated just after the resin is allowed to dwell under pressure following its filling in the mold cavity. Driving is effected by a hydraulic or pneumatic cylinder with the aid of an electric motor, etc. Reasonably, an actuation signal is outputted from the sequence of an injection-molding machine. The temperature of the mold is in a range of preferably 40°–100° C., more preferably 60°–90° C.

The conditions for injection molding may basically follow the above molding conditions. In the case of the composite polyethylene, it is noted that a compression ratio at the screw of 1.1–1.6 gives satisfactory molded pieces and brings about stable plasticization. It is also noted that the lower the cylinder temperature of a feeder zone, which is to be preferably brought down by fan-induced forced cooling, the lower the molecular weight of the obtained molded pieces.

The above polyethylene guide according to the present invention is advantageous over the conventional-metallic guides in the following points.

(1) In principle, the metallic guides cost twice as much as the resinous guide according to the present invention, because their production involves important steps of pipe cutting, mirror finish and plating.

(2) In the case of the metallic guides, their surfaces to slide over an associated tape member should have a surface roughness or Rmax of 0.1 μm or below. With the resinous guide according to the present invention, however, sufficient effects are obtainable even when its sliding surface has a roughness-after-finished or Rmax on the order of 2–5 μm, partly because of being consistent with the theory of tribology. Moreover, no special technique is needed for making molds.

(3) The resinous guide according to the present invention can make much more contributions to weight reductions than do the prior art metallic guides. This is less significant for a single cassette, but is more significant for the step of stocking a large amount of cassettes, as encountered in the cassette assembly line, firstly because a guide loader in the cassette assembly line can be made small and secondly because resinous guides can be placed in bulk, but metallic guides are likely to be damaged on their mirror-finished surfaces when they come into contact with each other due to their own weight. Usually, metallic guides are transported in the form of being arranged in a case or tray.

(4) A comparison of currently available metallic guides with polyethylene guides in terms of the stability-with-time, stability to temperature and humidity, running noise, weight and cost required for tape guides reveals that an ultrahigh-molecular weight polyethylene having a molecular weight exceeding 1,000,000 gives molded pieces having their stability-with-time comparable or superior to those of metallic guides now in use, partly because it excels in chemical resistance and partly because it is very stable to appearance changes.

Referring to the stability to temperature and humidity, in particular temperature, polyethylene guides are stable at usually applied temperatures. The results of experimentation indicate that they service well at a temperature of −45° C. to 80° C. during transportation, unless any particular external force is applied thereto. As regards the stability to humidity, polyethylene itself has a hygroscopicity of as low as 0.01% or below and so undergoes no change due to humidity.

Turning to running noises generated due to stick slipping, the results of experimentation indicates that the guide of polyethylene made composite according to the present invention is very limited in terms of stick slipping and so poses no practical problem at all. Therefore, running noises are reduced to practical levels even at high speeds.

The weight of polyethylene guides can be reduced to 1/5 to 1/10 of that of metallic guides.

The cost of polyethylene guides is cut down to about ½ of metallic guides by increased molding cycles.

For the sliding members of the present invention, use may be made of a composition comprising a polyethylene having a molecular weight of 1,000,000 or more and a polyolefin having a molecular weight of 1,000,000 or less, which is also included in the scope of the present invention. In what follows, reference will be made of the use of such a composition.

In general, the term "ultrahigh-molecular weight polyolefin" refers to a polyolefin having a viscosity-average molecular weight of 1,000,000 or more. As already mentioned, such an ultrahigh-molecular weight polyethylene per se shows no substantial flowability, and is thus characterized by having a melting viscosity so high that it is very low in compression- or extrusion-moldability, even by recourse to screws or rams.

In addition, the compression molding of the ultrahigh-molecular weight polyolefin alone takes a length of time as lone as 3 hours at an elevated temperature of 200° C., whereas its extrusion molding needs heating at around 250° C. to lower its melting viscosity, thus resulting in a reduction in its molecular weight due to heating and hence posing problems such as lowerings of impact resistance, wear resistance and coefficients of friction that are the characteristic features of the ultrahigh-molecular weight polyolefin.

To this end, various attempts have been made to improve the moldability of ultrahigh-molecular weight polyolefins without doing damage to their properties. For instance, Japanese Patent Kokai Publication No. 177036/1982 discloses an ultrahigh-molecular weight polyethylene composition comprising 100 parts by weight of an ultrahigh-molecular weight polyolefin having a molecular weight of 1,000,000 or more and 10–60 parts by weight of a low-molecular weight polyethylene having a molecular weight of 5,000 to 20,000 and having improved moldability. Japanese Patent Publication No. 41309/1983 describes a polyethylene composition comprising a mixture of 85–50 parts by weight of a high-molecular weight having a viscosity-average molecular weight of 500,000–150,000 with 15–50 parts by weight of a finely divided ultrahigh-molecular weight polyethylene having a viscosity-average molecular weight of 1,000,000 or more and a particle size of 10 mesh or less.

If inorganic materials are added to the ultrahigh-molecular weight polyolefin compositions to afford such properties as electrical conductivity and heat resistance to them, however, then their flowability gets so much worse that considerable difficulty is encountered in molding them. Although the use of a high-molecular weight polyolefin in place of the ultrahigh-molecular weight polyethylene gives rise to improvements in moldability, on the other hand, there arises a problem that the wear resistance of the resulting molded pieces is much more reduced than that of the ultrahigh-molecular weight polyethylene alone.

Especially when the ultrahigh-molecular weight polyethylene is to be molded to the thickness of 0.8 mm or below required for video tapes' guide bushes, etc., the orientation of the resin is so increased that the molded pieces can be reduced in strength. However, while the use of the high-molecular weight polyolefin in place of the ultrahigh-weight molecular weight polyolefin provides a solution to a strength problem, the former is inferior in wear resistance to the latter.

In order to eliminate such a problem, it is preferable to use as the polyolefin composition a composite composition comprising an ultrahigh-molecular weight polyethylene having a viscosity-average molecular weight of 1,000,000 to 6,000,000, a high-molecular weight polyolefin having a viscosity-average molecular weight of 300,000 to 1,000,000 and an inorganic material, said composite composition having a viscosity-average molecular weight of 500,000 or more.

Such a composite polyolefin composition may be prepared by mixing together the ultrahigh-molecular weight polyethylene, high-molecular weight polyolefin and inorganic material in such a way that the resulting mixture has a viscosity-average molecular weight of 500,000 or more and dry-blending that mixture by fast-stirring at a temperature up to the softening point of the high-molecular weight polyolefin and in an inert gas atmosphere.

The ultrahigh-molecular weight polyethylene used may then have a viscosity-average molecular weight of 1,000,000 to 6,000,000. For instance, use may preferably be made of Hi-Zex million 240 M ® (having a molecular weight of 2,900,000 and made by Mitsui Petrochemical Industries, Ltd.) and Hostaren GUR 412 ® (having a molecular weight of 2,400,000 and made by Hoechst, West Germany, both available in powdery forms, and so on. Alternatively, use may be made of a synthesized high-molecular weight polyethylene having a viscosity-average molecular weight of 1,000,000–6,000,000 or more, a so-called crosslinked polyethylene formed by crosslinking with a crosslinker or electron beams, and so on. In the present invention, the polyethylene used should preferably be in such finely divided forms as expressed in terms of a particle size of 10–300 μm, particularly 50–200 μm, in order to achieve as uniform mixing as possible.

As the high-molecular weight polyolefin, use may preferably be made of a high-molecular polyethylene or a high-molecular weight polypropylene, both having a viscosity-average molecular weight of 300,000–1,000,000 and a softening point of 80° to 90° C., or their mixture. As such a high-molecular weight polyolefin, use may preferably be made of a polyolefin such as Lubmer L5000P ® (having a molecular weight of 950,000 and made by Mitsui Petrochemical Industries, Ltd.) or Lubmer L3000P ® (having a molecular weight of 300,000 and made by Mitsui Petrochemical Industries, Ltd.) or Lu Polen 5261Z ® (having a molecular weight of 330,000 and made by BASF, West Germany), all being available in such finely divided forms as expressed in terms of a particle size of 10–300 μm, particularly 50–200 μm, or the like.

Problems with the above composition containing the high-molecular weight polyolefin having a viscosity-average molecular weight lower than 300,000 are that during molding, the resins are so decreased in the compatibility to each other that the molded pieces are decreased in strength with deteriorations of their wear resistance.

The apparent molecular weight M of a mixture comprising the ultrahigh-molecular weight polyethylene with the high-molecular weight polyolefin is defined by the following equation:

$$M = n \times \text{(the viscosity-average molecular weight of the ultrahigh-molecular weight polyethylene)} + (1 - n) \times \text{(the viscosity-average molecular weight of the high-molecular weight polyefin)}$$

The compositions of the present invention may be prepared by selecting n and the molecular weight of the ultrahigh-molecular weight polyethylene and the high-molecular weight polyolefin and mixing together them for composite-making purposes in such a way that their apparent molecular weight exceeds 500,000 and, more desirously, lies between 1,200,000 and 2,000,000. The mixing ratio of the ultrahigh-molecular weight polyethylene to the high-molecular weight polyolefin is in a range of 1 to (1−n)/n, which may vary depending upon the desired molding properties.

The inorganic materials to be mixed with the polyolefins may include carbon, gold, silver, aluminium, copper, chromium, nickel, iron, lead, molybdenum, zinc, tin, indium, bismuth, platinum, selenium, magnesium, manganese, cobalt, tungsten, titanium, germanium, etc., all being usable in a single element form. Preferably, electrically conductive elements such as carbon, silver, gold, aluminium, copper, iron, lead, zinc and nickel may be used alone or in combination of two or more. They are added in an amount of 0.1 to 20% by weight, preferably 1 to 8% by weight with their particle size being between 0.01 μm and 100 μm, preferably 0.05 μm and 10 μm.

Heat-resistant materials, surfactants, colorants, lubricants, stabilizers and so on may additionally be incorporated.

In order to improve heat resistance and rigidity, ceramics materials may further be mixed. The ceramics materials used may be those based on aluminium oxide, zirconia, calcium, silicone, silicon and the like or short fibers such as carbon fibers and Kepler fibers. Such materials are added in an amount of 0.1 to 20% by weight, preferably 1 to 10% by weight. The additives have a particle size of 0.01 to 100 μm, preferably 0.05 to 10 μm.

It is preferable to use fluorine base surfactants as the surface active agents. The fluorine base surfactants used may include anionic ones such as ammonium salts of perfluoroalkyl sulfonic acids, potassium salts of perfluoroalkyl sulfonic acids and potassium salts of perfluoroalkyl carboxylic acids; cationic ones such as iodides of perfluoroalkyl quaternary ammonium; and nonionic ones such as perfluoroalkyl polyoxyethylene ethanol and fluoroalkyl esters. They are all effective for improving the sliding properties with respect to polyester films that are magnetic tape materials. Among others, the anionic surfactants based on fluorine are most effective, probably because of the anionic, cationic and nonionic systems, the anionic ones are so low in the compatibility in polyethylene that they can bleed out onto the surfaces of molded pieces even in slight amounts. The fluorine base surfactants should be added in an amount of preferably 0.01 to 5% by weight, more preferably 0.1 to 1% by weight.

For their uniform dispersion at the time of mixing, it is desired that said fluorine base surfactants, either in powdery forms or in viscous liquid forms, be dissolved in and diluted to a low concentration with an organic solvent which can be evaporated off at relatively low temperatures and in which they are soluble such as, for instance, methanol, ethanol, isopropyl alcohol, acetone and methyl ethyl ketone. The resulting solution may further be atomized with a spray, etc. at the time of mixing for its uniform dispersion. Alternatively, finely divided powders of a fluorine resin such as polytetrafluoroethylene having a mean particle size of 5 to 20 μm may be added. Such fluorine resin powders are added in an amount of 0.1 to 30% by weight, preferably 5 to 25% by weight.

When the above polyolefin composition is formed into a guide for magnetic tapes, the addition of a hydrocarbonaceous oligomers having a number-average molecular weight of 400 to 4000, e.g., an ethylene-α-olefin oligomer is much more effective for improving the sliding properties. The amount of the hydrocarbonaceous oligomer added should be in a range of 0.1 to 20% by weight, preferably 3 to 10% by weight.

Next, reference will be made to how to prepare the above composition.

For mixing together the ultrahigh-molecular weight polyethylene, high-molecular weight polyolefin and inorganic material with the additives added, if required, use may be made of a fast-stirring mixer such as a Henschel mixer. Such materials are then dry-blended together under the following stirring conditions; at a temperature from normal temperature to the softening point (80°–90° C.) of the high-molecular weight polyolefin in an atmosphere of an inert gas such as nitrogen gas and at a stirring speed of 10 to 10,000 rpm, desirously 500 to 4,000 rpm for a stirring time of 10 to 30 minutes, desirously 2 to 8 minutes. This object is to physically deposit the inorganic component onto the surface of powder particles, primarily the surface of the ultrahigh-molecular weight polyethylene. The thus mixed materials are considered to be well-dispersed, and are effective for preventing a lowering of the molecular weight of the substrate which may otherwise be caused by more intensive heating than required or shear stress with a screw so as to improve the dispersibility of the respective components in the barrel of an injection-molding machine.

The function of the ultrahigh-molecular weight polyethylene varies depending upon how high or low molecular weight it has. For instance, when it is applied to a guide bush for video tapes, its molecular weight correlates with the friction occurring between that guide bush and a PET film that is a tape material. In other words, if its molecular weight is below 500,000, then the guide bush wears away, whereas if its molecular weight is higher than 2,000,000, then the PET film wears away prematurely. Thus, how high or low molecular weight the ultrahigh-molecular weight polyethylene possesses has so important relation to its use that its molecular weight has to be regulated depending upon what properties the products are required to have.

The above polyolefin composition is prepared by mixing the ultrahigh-molecular weight polyethylene with the high-molecular weight polyolefin in such a way that the resulting viscosity-average molecular weight amounts to 500,000 or more, further adding the inorganic material to the mixture and making that mixture composite by dry-blending with fast-stirring in an inert gas atmosphere, whereby its flowability and moldability can be improved without causing damage to the wear resistance properties of the ultrahigh-molecular weight polyethylene. Especially when the polyolefin composition has a viscosity-average molecular weight lower than 500,000, there is a sharp drop of wear resistance.

The above composition can be produced in simple manners and easily prepared if only a mixer is available. In making it composite, the powder particles of the ultrahigh-molecular weight polyethylene can be brought in close contact with, or uniformly dispersed throughout, the high-molecular weight polyolefin or the inorganic material by the frictional heat generated by mixing them together.

The thus produced composition is so improved in moldability at a thickness up to 0.8 mm that it can be molded into a piece or part of improved wear resistance without causing a drop of its strength by not only injection molding but also sheet extrusion molding.

Injection-Molding Machine

As already mentioned, polyethylene resins increase generally in their melting viscosity with an increase in their molecular weight. Especially at a molecular weight exceeding 1,000,000, they are so likely to stagnate in the barrel of a general (in-line screw type of) injection-molding machine that they cannot be molded. When they are to be forcedly plasticized, the main molecular chain of polyethylene is cut out by high shear stress occurring between the barrel and the screw, resulting in the formation of polyethylene having its molecular weight reduced. As already mentioned, such low-molecular weight polyethylene (having a molecular weight below 500,000) is unfit for the tape guides of the present invention.

Heretofore, the ultrahigh-molecular weight polyethylene has thus been molded by compression molding or extrusion molding. With such molding techniques, however, it is impossible to obtain molded pieces or parts of high accuracy at low costs.

On the other hand, improvements in the rigidity of gears, etc. are considered to be achievable by making the ultrahigh-molecular weight polyethylene composite with an inorganic material such as carbon fibers. With compression molding, the inorganic material may be made composite with the ultrahigh-molecular weight polyethylene in powdery forms, since the former is fused onto the surface of each particle of the latter. With ordinary injection molding, however, the inorganic material is made composite with the ultrahigh-molecular weight polyethylene by way of the fusion of its respective particles, thus resulting in its molecular weight being reduced and its basic properties being lost.

According to the method of the present invention, it is possible to efficiently obtain injection-molded pieces of high accuracy from a raw material comprising the ultrahigh-molecular with or without the inorganic material to be made composite with it by means of injection molding.

The injection-molding machine used in the present invention is an in-line screw type of molding machine in which a hopper is connected with an atmospheric gas supply pipe for melting an ultrahigh-molecular weight polyethylene feed in a non-oxidizing atmosphere, only the compression and nozzle zones of a cylinder with a built-in screw are provided with heaters and a heat-radiating zone is defined by a part of a feeder region.

A more illustrative example of an injection-molding machine will now be explained with reference to the accompanying drawings.

Figure 3:
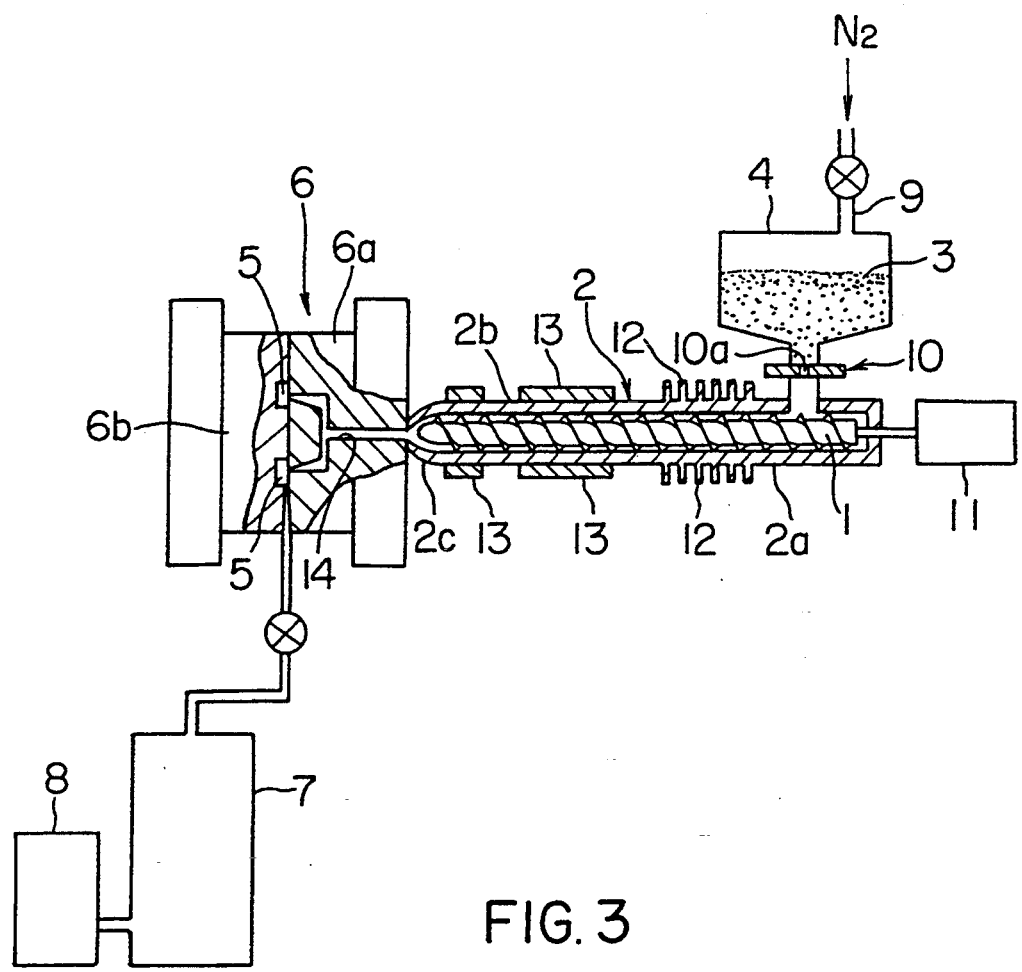

FIG. 3 is a sectional view illustrating an injection-molding machine which may be used to make the sliding members of the present invention. Main parts of this injection-molding machine are a cylinder 2 with a built-in screw 1, a hopper 4 for inputting a feed stock 3 into the cylinder 2, a mold 6 having therein a molding cavity 5, in which the leading end of the cylinder 2 is located, a vacuum tank 7 for vacuumizing the cavity 5 and a rotary pump 8.

The hopper 4 is connected with a pipe 9 for supplying to it an atmospheric gas such as nitrogen gas so as to melt the feed stock 3 fed into the cylinder 2 in a non-oxidizing atmosphere. At its lower portion, the hopper 4 includes a regulating plate 10 having therein a circular or rectangular slit 10a for regulating the input of the feed stock 3.

Suitably, the screw 1 driven by a vane motor 11 gives rise to a compression ratio of 2.3 or below, esp., 1.3–2.0 with the length to diameter (L/D) ratio being in a range of preferably 10–25, more preferably 15–20. The pitch (P) of the screw is determined by:

$$P = \pi D \tan\theta$$

wherein $\theta$ is preferably in a range of 10°–18°, esp., 11.5°–14.5°.

At a compression ratio higher than 2.3, on the one hand, so higher a pressure than required is applied to the ultrahigh-molecular weight polyethylene powders that they remain stagnant and so lose flowability simultaneously with the initiation of crosslinking. A compression ratio lower than 1.3 is, on the other hand, insufficient to melt the surfaces of the ultrahigh-molecular weight polyethylene powders.

At an L/D ratio exceeding 20, on the one hand, the ultrahigh-molecular weight polyethylene is likely to stagnate in the cylinder for a time longer than required. At an L/D ratio short of 15, on the other hand, the accuracy of heating control of the ultrahigh-molecular weight polyethylene is less than satisfactory.

Determined by the flight angle $\theta$, the screw pitch makes determination as to how much torque is applied to the ultrahigh-molecular weight polyethylene. At an angle $\theta$ short of 10°, sufficient torque is obtained but the residence time is made longer than required with frictional energy applied to the ultrahigh-molecular weight polyethylene powders. An angle $\theta$ exceeding 18° is unsuitable, since the torque applied to ultrahigh-molecular weight polyethylene is so insufficient that a burden is placed on the vane motor and no prescribed rpm is obtained, resulting in the polyethylene remaining stagnant in the cylinder over an extended period of time.

Without recourse to any back-flow ring, the screw head has a flight extending to its extreme end, and is smaller in diameter than the inner diameter of the cylinder 2 by 0.1 to 0.2 mm.

The cylinder 2 is divided into a rear section defining a feeder zone 2a and a front section defining a compression zone 2b with the leading end defining a nozzle zone 2c. Preferably, the length of the feeder zone 2a, over which a heat-radiating fin 12 is to be mounted, is ¼ to ⅓ of the entire length of the cylinder 2.

The ultrahigh-molecular weight polyethylene powders are delivered by the screw through the cylinder, and generate heat due to their friction, as the compression ratio increases. It is when the polyethylene reaches the compression zone of the screw that this state is achieved, and it is in this zone 2b that the powders are individually softened for the first time by external heating. In other words, in the zone 2a in front of the zone 2b, heating should be avoided as much as possible to radiate frictional heat, thereby preventing crosslinking.

In the absence of the heat-radiating fin 12, heating control at the compression zone 2b is so impossible that the polyethylene powders can be prematurely crosslinked. For the instantaneous melting of the feed stock 3, the compression and nozzle zones 2b and 2c are provided with heaters 13.

In what follows, the geometry of the screw head according to the present invention will be explained in detail.

In order to obtain highly accurate injection-molded pieces of the ultrahigh-molecular weight polyethylene, it is essentially required to apply sufficient injection rates to the resin at the injection step and give sufficient pressures to the resin in the process of filling it in the mold cavity. From the flowability of the ultrahigh-molecular weight polyethylene, it has now been found that of particular importance for improving shapeability and dimensional accuracy is to maintain the pressure applied to the resin at the dwell step. As an outcome of various studies, it has been found that satisfactory results are obtained, if the means capable of maintaining sufficient pressures to the resin at the dwell step is designed as follows, with no provision of a back-flow ring to the screw, unlike conventional injection-molding machines.

More specifically, the screw head portion following the screw portion of the screw body is constructed from a cylindrical section having a diameter equal to or smaller than the diameter of a groove in a metering region of the screw and a conical section contiguous to and extending from it.

Figure 4:
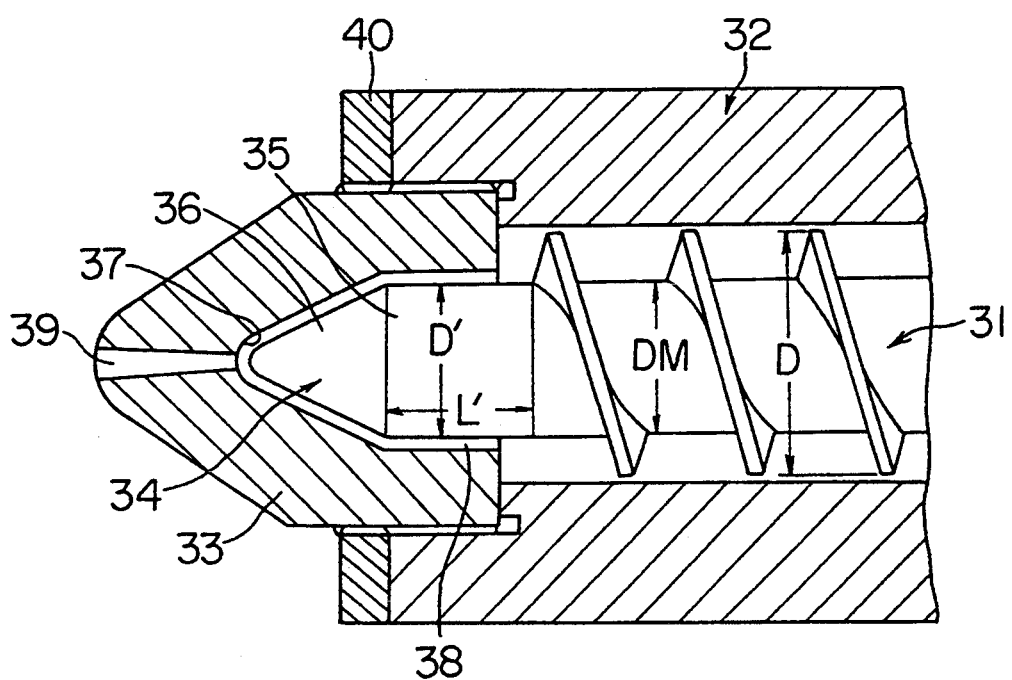

Part of the screw head portion of the injection-molding machine used in the present invention is shown in the sectional view of FIG. 4, wherein reference numeral 31 stands for a screw, 32 a cylinder (a barrel) and 33 a cylinder nozzle. Reference numeral 34 indicates a screw head portion, which is constructed from a cylindrical section 35 extending from the screw portion and a conical section 36 contiguous to and extending from it. The cylinder nozzle 33 is threadedly fixed to an end portion of the cylinder 32 with its inner bore wall 37 following the shape of the screw head portion 34. When the screw 31 moves forward to such a position as illustrated, there is formed a gap or space between the cylindrical section 35 of the screw head portion 34 and the inner bore wall 37 of the cylinder nozzle 33, which defines a pressure-to-the-resin (hereinafter called the resin pressure) generating region 38—an important feature of the present invention. This pressure generating region 38 may be located between the cylindrical section 35 and the cylinder 32, not the cylinder nozzle 33. It is noted that reference numerals 39 and 40 stand for a nozzle tip and a lock nut, respectively.

In the case of the conventional injection-molding machines, a conical section extends directly from the screw portion in the absence of an equivalent of the cylindrical section 35. Instead, a back-flow ring having a diameter substantially equal to the cylinder diameter is provided to the screw head portion, and is designed in such a way that it stops at the extreme end of the cylinder, even when it moves forward to a maximum.

According to the present invention, it is possible to prevent the back-flow of the resin at the time of dwell by meeting the condition of D'D' wherein D is the diameter of the screw 31 and D' is the diameter of the cylindrical section 35 of the screw head portion 34. However, the length L' of the cylindrical section 35 can be determined arbitrarily.

Referring then to the resin pressure generating region 39, the diameter D' of the cylindrical section is preferably identical with or smaller than a groove diameter DM of the flight lying on the metering region of the screw 31. The length L' may meet $1/10D' \leq L' \leq 10D'$, preferably $\frac{1}{2}D' \leq 3/2D'$.

The screw head portion 34 may be adapted to be separated from the screw 31. In this case, another screw head 34 having a length L' varied depending upon the nature of the resin used may be provided to regulate the generation of a dwell pressure arbitrarily.

Reference will now be made to how to make molded pieces of the ultrahigh-molecular weight polyethylene with the use of such an injection-molding machine as mentioned above.

The ultrahigh-molecular weight polyethylene in the form of fine powders having a particles size of about 30 to 100 μm is first supplied as the feed stock 3 into the hopper 4 shown in FIG. 3. It is here noted that the input of the feed stock per time can be determined only by the regulation of the diameter 10a because, unlike ordinary polyethylene, the ultrahigh-molecular weight polyethylene is in powdery form, rather than in pellet form, so that the coefficient of friction among the polyethylene particles can be reduced. The regulation of the input of the feed stock to the feeder zone 2a means that the compression ratio of the screw 1 decrease relatively, with the result that when the ultrahigh-molecular weight polyethylene is plasticized, the compression ratio is so excessively increased that the stagnation of the feed stock in the cylinder 2 can be avoided.

Then, the ultrahigh-molecular weight polyethylene fed into the cylinder 2 is delivered from the feeder zone 2a to the compression zone 2a, in which it is instantaneously heated. That polyethylene is in turn melted (on its surface alone) in the nozzle zone 2c. It is here noted that since the hopper 4 is filled with a nitrogen gas, the cylinder 2 is therein maintained in a non-oxidizing atmosphere to prevent the molecular weight of the polyethylene from being reduced by oxidation. The ultrahigh-molecular weight polyethylene has the property of starting crosslinking immediately upon melted. Thus, if the polyethylene is momentarily melted in the compression zone and, just thereafter, is cast through the nozzle zone into the cavity 5, as carried out in the present embodiment, then it is possible to cast the molten polyethylene in the cavity, while it remains flowable.

Mold

As means for molding the ultrahigh-molecular weight polyethylene into industrial small parts, etc., injection molding, compression molding and extrusion molding are considered available. However, the ultrahigh-molecular weight polyethylene shows no flowability at all, since its viscosity is not decreased even when heated due to its excessively high molecular weight. For that reason, it is impossible to fill the ultrahigh-molecular weight polyethylene to details of the cavity even with injection molding. Neither can the molded pieces be smoothened owing to their inferior accuracy. A problem with the plasticization of the ultrahigh-molecular weight polyethylene with the screw of an injection-molding machine is that it is oxidized and undergoes cutting of its main chain by heating under high shear load, resulting in a reduction in its molecular weight.

In order to solve such problems, there have been filed a few patent applications, which have now been published under Japanese Patent Publication Nos. 57-30067 and 60-58010. However, to put the techniques set forth there to practical use has faced the following problems. For instance, it has been proposed to compress the resin injected into a cavity to a volume 1.5 to 3.0 times as large as the input of the resin injected. However, problems with this technique is that:

(1) since there is a need for increasing the cavity volume, the mold is so complicated in structure that difficulty is encountered in molding small or sophisticated pieces and producing molded pieces in bulk;

(2) due to a need for increasing a clearance between the sliding surfaces of the mold, there are formed burrs which have to be removed by post treatments; and (3) since only a pin-gate system can be utilized, some limitation is imposed on how to gate and what form molded pieces are to take, thus making the design and production of an optimum mold difficult.

In order to solve such problems, the present inventors have already invented an injection-molding machine (Japanese Patent Kokai Publication No. 9723/60) in which, as illustrated in FIG. 3, makes use of an ordinary mold with no provision of any compression mechanism.

For conventional sliding guides for magnetic tapes, on the other hand, light metals such as brass are cut into guide forms which are chromium-plated or otherwise treated on their sliding surfaces for mirror finishing, thereby improving their heat resistance and wear resistance. Some sliding guides are formed of stainless metals.

However, the above prior art techniques have the following problems.

First, problems with such injection molding as in Japanese Patent Publication Nos. 30067/1982 and 58010/1985 already referred to are that:

(1) how to gate is limited to a pin gate;

(2) the mold is so complicated that difficulty is encountered in molding small or sophisticated pieces and producing molded pieces in bulk; and (3) residual stress due to compression force has a strain or otherwise adverse influence upon the products.

A problem with such injection molding as disclosed in Japanese Patent Application No. 9723/1985 is that since the resin used is poor in flowability, there is a difference in the amount of contraction among the molded pieces, which varies in proportion with a distance from the gate. Especially in connection with precise molded pieces which are in cylindrical form and required to have roundness, there arises a problem that since the resin fed through the gate has a sharp pressure gradient in the cavity, it is impossible to maintain the dimensional accuracy of molded pieces at the end of a flow path.

In view of conventional sliding guides for magnetic tapes, on the other hand, the following problems arise.

(a) Since the conventional sliding guides for magnetic tapes are chromium-plated or formed of stainless on their surface, it is required to improve the surface roughness of the chromium-plated surfaces with a view to preventing the back sides of the magnetic tapes from being damaged or increasing frictional resistance.

(b) Since metallic tape guides are basically harder than the base films of magnetic tapes, it is required to mirror-polish the metallic tape guides so as to clear them of irregularities. In view of tribology, the fundamental principle of material combinations are ideally that a tape of larger momentum must be harder than an associated tape guide. Thus, the combinations heretofore applied are contrary to this fundamental principle. To put it another way, it is essential that the material of tape guides be softer than the material of the base films of magnetic tapes.

The mold according to the present invention, designed to solve the above problems, makes use of an injection mold fit for the flow characteristics of a polyethylene having a molecular weight not less than 300,000, rendering it possible to mold sliding guides for magnetic tapes, which have on their sliding surfaces a polyethylene whose molecular weight is not less than 500,000.

To this end, the injection mold according to the present invention is characterized by including a cavity in which a polyethylene having a molecular weight of 500,000 to 6,000,000 inclusive is filled through a gate suitable for the shape of pieces to be molded, a piece slidable in or out of said cavity, and a spring for generating a compression force counter to the resin pressure through said piece, whereby the leading end of the resin flowing through the cavity is compressed with a pressure corresponding to the volume of the resin filled.

In the present invention, the polyethylene having a molecular weight not less than 500,000 is injection-molded, thereby making it easy to transfer the mold surface to the pieces to be molded and reduce surface roughness; improving shapeability. A reduction in frictional resistance and the surface undulation of the molded pieces are also prevented, resulting improvements in the travelling characteristics of tapes.

The reason is that the pressure distribution of resins differs generally at their flowing ends and at gates; it is higher at the latter than at the former. This tendency becomes particularly marked as the molecular weight increases. This causes the mold shrinkage factor to differ considerably at the gates and the flowing ends. As a result of intensive studies, the present inventors have found that the internal volume of the cavity is varied by the resin pressure and the spring for the die, whereby the resin pressure at the flowing end, which decreases as the resin is spaced away from the gate, can be rather increased by the displacement of the spring so that the resin pressure at the gate and the flowing end can both be made uniform. Thus, the present invention has been accomplished.

More illustratively, the features of the mold according to the present invention are as follows.

(1) The pressure applied to the resin by injection (measured by an in-mold sensor) is preferably in a range of, for instance, 200 to 3000 kg/cm$^2$, especially 500 to 2000 kg/cm$^2$. Under such conditions, the compression pressure (applied directly to the resin) is preferably in a range of, for instance, 5–300 kg/cm$^2$ especially 10–100 kg/cm$^2$.

(2) Selection of Gate

Three types of gates, i.e., pin, side and film gates may all be applicable to injection molding. However, the pin and side gates are less likely to give strength and accuracy, since weldlines occur on the guide of the present invention. As a result of intensive studies, the present inventors have found that of the film gates, an annular type of film gate can be used to satisfy both strength and accuracy. The gate has a width of 0.1 to 2.0 mm, preferably 0.3 to 0.1 mm.

The polyethylene having a molecular weight of 500,000 or higher is passed through the annular gate, thereby making it easy to fill it in the cavity for obtaining thin-wall molded pieces. The gate is also so concentric with the molded pieces that their short shot can be prevented with improvements in their roundness. Gate cutting is effected in the mold during molding, while a gate cutting piece (an inner core) is extended by a pressure cylinder for gate cutting. More effectively, gate cutting is effected just following the dwell step. In this manner:

(1) In the cooling step just following the dwell step, the back-flow of the resin from the cavity to the sprue is prevented by cutting off the gate, so that stable molded pieces can be obtained. The above back-flow phenomenon occurs when the pressure applied by the injection-molding machine to the resin filled in the cavity is released by the sprung pressure of the die according to the present invention. This also takes place by the elastic deformation of the molten resin.

Since gate cutting timing is set just following the dwell step, the resin at the gate is kept at high temperatures. Thus, gate-free molded pieces can be obtained even by gate cutting making use of shearing, so that the products can sufficiently perform their own functions with no need of any post step.

(3) The overall process can be cut short, since gate cutting can be carried out simultaneously with the molding step.

It is understood that for the resinous guides according to the present invention, the polyethylene having a molecular weight of 500,000 or higher may be used alone and, more effectively, it may be made composite with carbon or hydrocarbonaceous oligomers, polyethylene waxes, fluororesins and the like. Even in this case, no limitation is imposed on the present invention. In other words, although the melting viscosity of the resin is further increased by composite-making, yet it is possible to impart sufficient shapeability to high-viscosity materials, if the mold and injection-molding technique according to the present invention are used.

As already mentioned, plastic materials are non-Newtonian fluids which decrease generally in their apparent viscosity at increased shear rates. This is also true of the polyethylene having a molecular weight of 500,000 or higher. In actual molding, this implies that viscosity decreases at increased shear rates so that thin-wall molding is feasible, thus giving rise to improvements in shapeability.

As an example, it is possible to mold sliding guides for magnetic tapes by increasing shear rates and decreasing viscosity, because they are in thin-wall form.

The problems then arising are that:

(1) voids are generated, because the resin being molded entrains the air remaining in the mold;

(2) short shots are generated, as if the volume of the cavity is decreased, because no air escapes from within the cavity; and (3) resin burning occurs due to the friction between the flowing end of the resin and the air, resulting in a lowering of its molecular weight.

According to the above mold of the present invention, the cavity space is so filled with the insert piece at an initial stage of filling that the air prevailing in the runner and sprue portions is under reduced pressure. At the time of resin filling, therefore, the amount of air remaining in the cavity is so small that the above problems can be eliminated.

Preparation of Feed Stock

In what follows, reference will be made to how to composite the ultrahigh-molecular weight polyethylene inputted in the above injection-molding machine.

Figure 5:
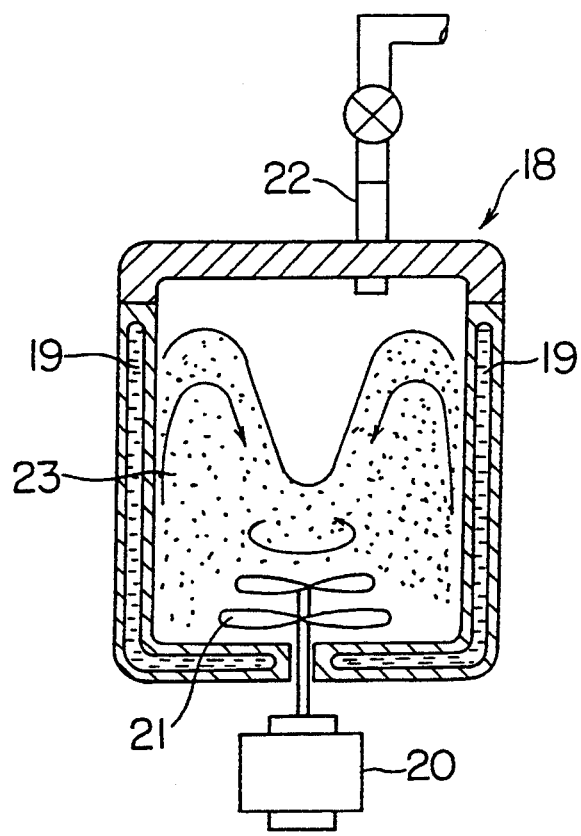
FIG. 5 is a sectional view illustrating a jar for making an ultrahigh-molecular polyethylene used in the present invention composite.

FIG. 5 is a longitudinal section of the jar used for compositing the ultrahigh-molecular weight polyethylene. A jar 18 includes a side wall filled with an oil 19 for heating, is provided at its bottom with an agitating blade 21 rotated by a motor 20 and is connected through its upper portion with a pipe 22 for feeding a non-oxidizing atmospheric gas such as nitrogen gas.

The ultrahigh-molecular weight polyethylene and the material to be made composite with it are to be inputted in the above jar 18. That material is preferably an inorganic material such as $CaCO_3Al_2(OH)_3$, $Al_2O_3$, $Ca_3(PO_4)_2$, glass fiber powders, carbon fibers powders, wood powders, paper powders, glass beads, metal particles and carbon, which are added in an amount of 30% by weight or less, particularly 3 to 30% by weight. At the same time, the aforesaid organic materials may be added.

A mixture 23 of the ultrahigh-molecular weight polyethylene with the material to be made composite with it is inputted and mixed in the jar 18 fixed at a temperature of 80° to 120° C., preferably 85° to 100° C., while the speed of rotation the agitating blade 21 is rotating at 1,800 to 3,000 rpm. After the temperature of the mixture 23 reaches 110° to 120° C., the speed of rotation of the agitating blade is reduced to 90 rpm. The thus composited ultrahigh-molecular weight polyethylene is placed in a cooling jar in which it is cooled down to normal temperature at 60 rpm.

That is to say, if the ultrahigh-molecular weight polyethylene particles are completely melt, then compositing cannot be achieved. By carrying out agitation in the above-manner, however, the ultrahigh-molecular weight polyethylene particles absorb heat from the wall surface of the jar 18, and are then softened on their surfaces by frictional heat by agitation. Thereupon, the material to be composited is driven and deposited onto the softened particles' surfaces by acceleration by agitation. Thus, compositing is achieved.

The thus composited raw material is inputted in the hopper 4 of the injection-molding machine shown in FIG. 3, in which it is melted within such a short time as already mentioned. The melt is immediately injected into the cavity for molding.

Illustrative Example of Injection Molding

First of all, an ultrahigh-molecular weight polyethylene having a molecular weight of 3,000,000 (Hi-Zex million 240 M made by Mitsui Petrochemical Industries, Ltd.) was inputted in the hopper 4 of the injection-molding machine according to the present invention, and the slit 10a for regulating the input of the feed stock, located at the bottom of the hopper, was fully opened. The screw had then a diameter of 40 mm, a compression ratio of 1.4, a pitch of 30 mm, an L/D ratio of 20 and a speed of rotation of 180 rpm. The nozzle (an open nozzle) and compression zones 2c and 2b of the cylinder 2 were fixed at 220° C. and 170° C., while the feeder zone 2a was not heated, but reached 70° to 100° C., as measured during molding. Further, the hopper 4 was fed with a nitrogen gas at a ratio of 1.0 liter/min.

Figure 8:
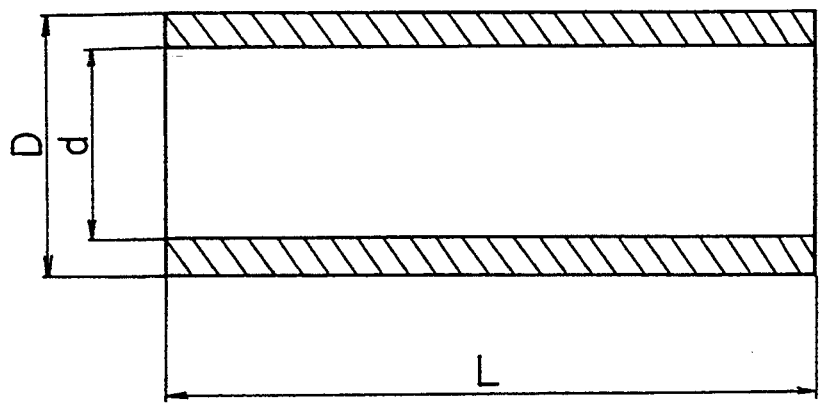

On the other hand, the mold 6 was fixed at 70° C., while the cavity 5 was vacuumized to $10^{-3}$ torr. Molding was carried out with an annular gate (having a gate width of 0.8 mm) for the sliding guide for magnetic tapes so as to obtain molded pieces in which D=6 mm, D=4.85 mm and L=16 mm, as shown in FIG. 8.

The molding conditions were an injection time of 0.3 sec., a dwell time of 3 sec., a cooling time of 20 sec., an interval of 3 sec. and an overall cycle of 26.5 sec. The pressure to be applied to the resin in the mold was fixed at 800 kg/cm$^2$ (as measured by a sensor), and the spring for producing a compression effect was built in the mold with a spring constant and deflection, both calculated and determined such that when the resin was filled in the cavity and the piece to be molded reached L =16 mm, the spring produced a compression pressure of 15 kg/cm$^2$.

The above present invention, in particular, the characteristic features of the mold assembly, will now be explained in more detail with reference to the following embodiment.

Figure 6:
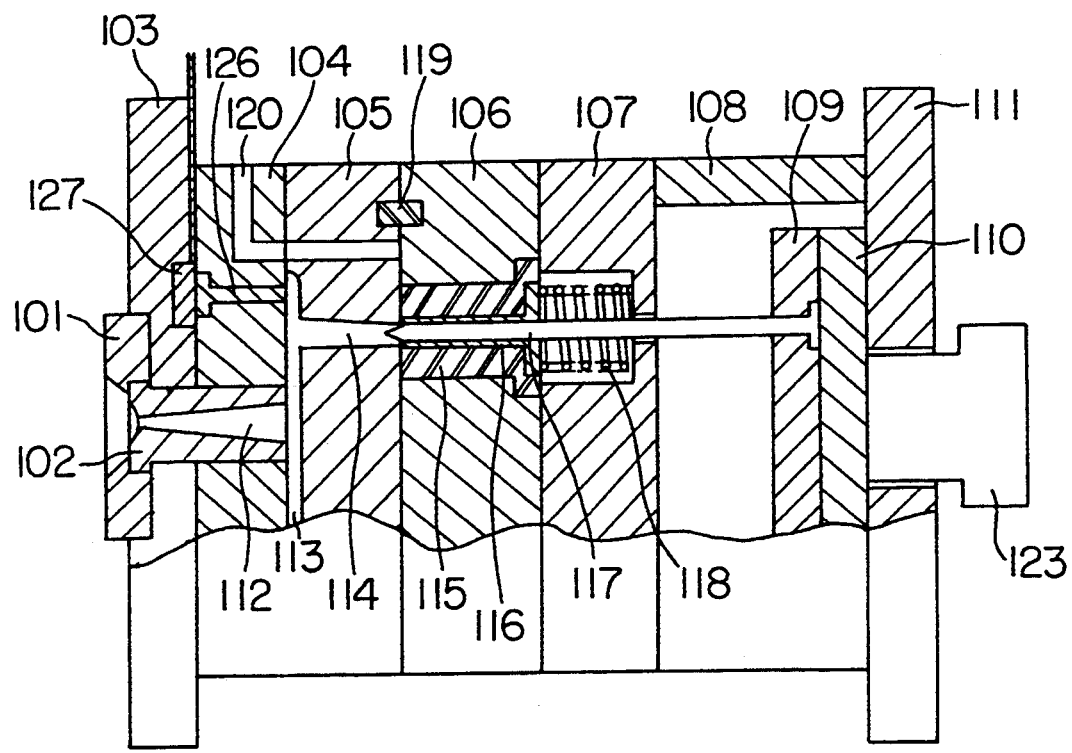

FIG. 6 is a sectional view of a 12-cavity mold assembly for injection-molding 12 sliding guides for magnetic tapes according to the embodiment of the present invention.

Referring to this figure, the mold assembly comprises a fixed bottom plate 103, a runner plate 104, a fixed retainer plate 105, a movable retainer plate 106, a back plate 107, a spacer plate 108, an ejector front plate 109, an ejector back plate 110 and a movable bottom plate 111 with a vacuum packing 119 interposed between the fixed and movable retainer plates 105 and 106 and O-rings (not shown) provided between the respective plates for complete sealing. While the mold is closed up, it is placed in a completely closed-up state and vacuumized through a hole 120 for vacuumization by means of a vacuum pump.

Reference numeral 101 stands for a locating ring, 102 a sprue bush, and 112 a primary sprue formed in the sprue bush 102. A pressure sensor pin 126 is slidably fitted with respect to the runner plate 104 to transmit a load due to the resin pressure from a runner 113 to a sensor 127 therefor. The transmitted load is fed back to a machine control for closed-loop controlling.

The cavity is constructed from a movable piece 115, a compression piece slidable by the resin pressure and a spring force and an inner core (a gate cutting piece) 117. When the cavity is unfilled, the compression piece 116 is in an advanced position with a gap of 1 mm located between it and the fixed retainer plate 105. The movable piece 115 is slidably fitted with the compression piece 116 in such a way that as the resin flows in the cavity and so the volume of the cavity increases, the compression piece 116 is retracted by the resin pressure. The compression piece 116 is connected and fixed with a spring 118 for generating a reaction force with respect to the resin pressure and determining the volume of the cavity by the resin pressure and spring force, thereby distributing the resin pressure uniformly throughout the piece to be molded. That is to say, the characteristic feature of the present invention is to vary the volume of the cavity by the amount of the resin filled, thereby generating a spring force corresponding to that volume or a force for making the cavity pressure distribution uniform.

Figure 7:
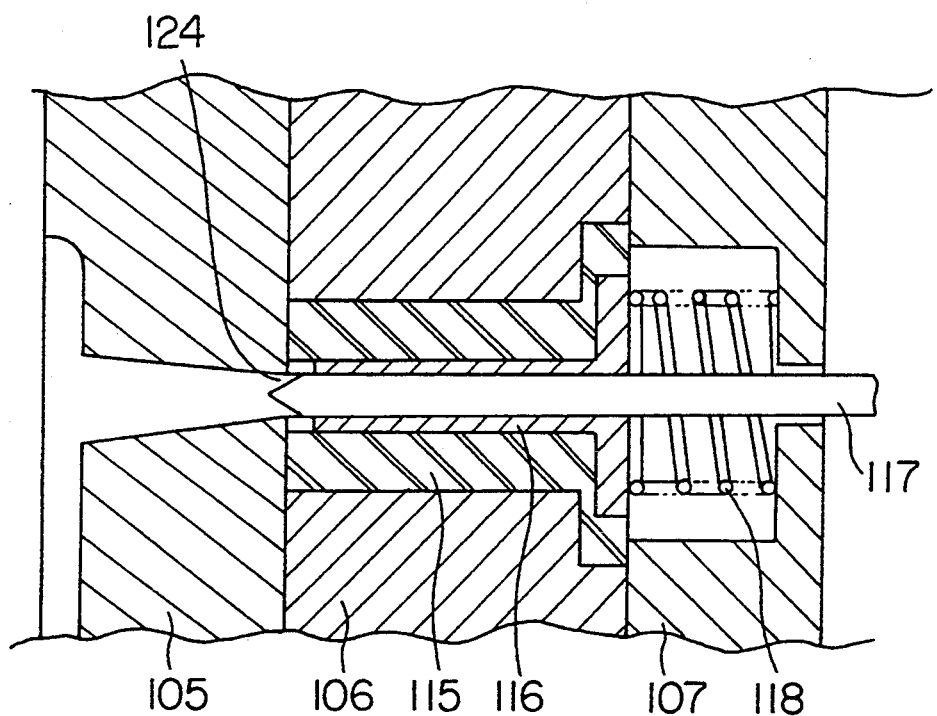

As illustrated in FIG. 7, an annular gate 124 is located between the inner core (gate cutting piece) 117 and a secondary sprue 114. The inner core (gate cutting piece) 117 and the compression piece 116 are slidably fitted with each other, so that the inner core (gate cutting piece) 117 is ejected forward through the ejector front and back plates 109 and 110 for gate cutting by driving a pressure cylinder 123 for gate cutting, thereby cutting the annular gate 124.

An illustrative example of the injection compression molding process will now be explained.

The process is started from mold closing. In the course of mold closing, the vacuum pump is actuated to start vacuumizing the mold. At the time of completion of mold closing, the mold is vacuumized to about $10^{-3}$ torr. Afterwards, the weighed ultrahigh-molecular weight polyethylene is injected from the cylinder into the mold and filled in the cavity through the primary sprue 112, runner 113, secondary sprue 114 and annular gate 124. The resin is measured in terms of its pressure by the pressure sensor 127 and enters the dwell step after the preset pressure (800 kg/cm$^2$) is reached. Simultaneously with the completion of the dwell step, the pressure cylinder 123 for gate cutting is driven for gate cutting by the inner core (gate cutting piece) 117, Afterwards, the resin enters the cooling step and, in the meantime, the resin is weighed out in the cylinder for the next shot. As the cooling step is completed, the mold is so opened that the compression piece 116 is ejected forward by the spring 118 with the molded piece being pushed out of the mold. In this manner, a succession of molding steps are completed.

As a result of measuring the dimensions of the thus obtained sliding guides for magnetic tapes, it has been found that they are in a range of 10 μm of the standard dimensions and have a roundness of 15 μm.

According to the present method and apparatus in which, as explained above, a polyethylene having a molecular weight of 500,000 or higher is instantaneously melted and the melt is immediately injected into the cavity, it is possible to easily produce molded pieces of high precision such as sliding guides for tapes. By injection compression-molding a polyethylene having a molecular weight of 500,000 or higher, it is also possible to achieve improvements in shapeability such as easy transfer of the mold surface and a reduction in surface roughness. In addition, reductions in frictional resistance and the prevention of undulation of the molded piece' surfaces are achieved, thus making it possible to improve the travelling characteristics of tapes.

Because of having self-wettability, the obtained sliding guides for tapes dispenses with lubrication and so are applicable both in vacuo and in the water.

EXAMPLE 1

Figure 9:
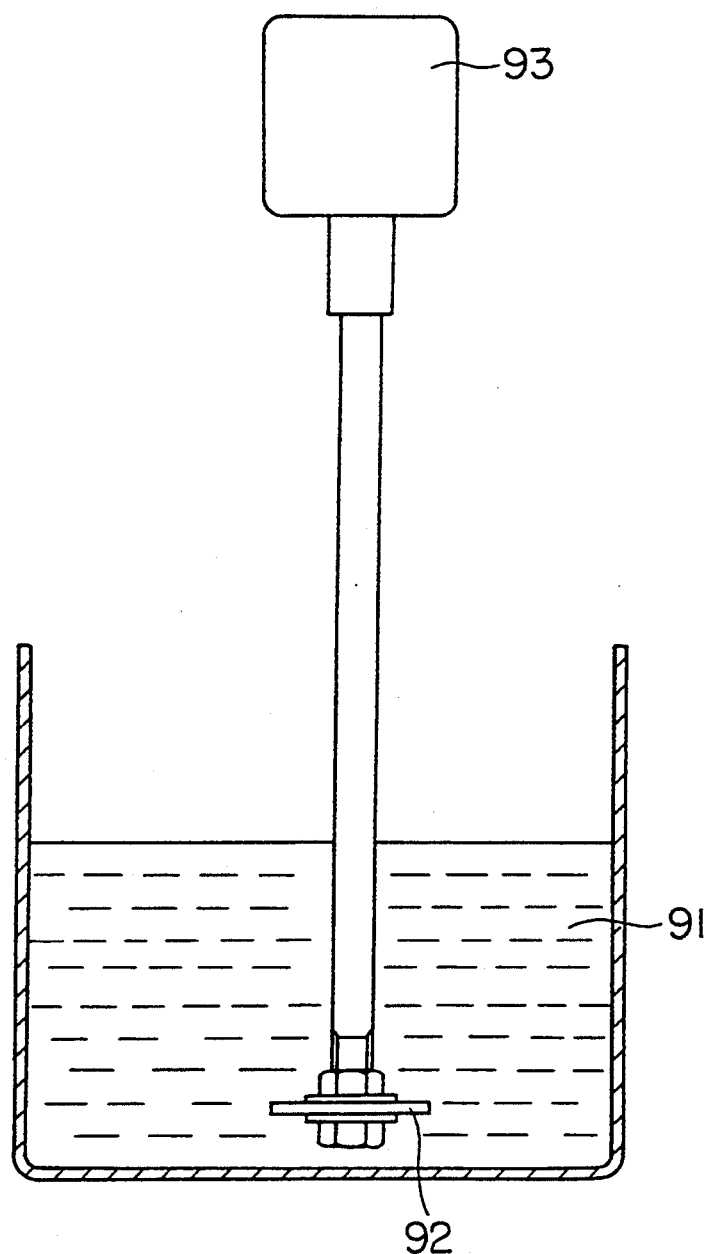
FIG. 9 is a schematic view illustrating part of a sand slurry tester.

With such an injection-molding machine as shown in FIG. 3, polyethylene resins having varied molecular weights were molded, and the wear resistance of the polyethylene resins was estimated with such a sand slurry testing machine as shown in FIG. 9.

Referring to the testing conditions, a slurry 91 was prepared by adding 2 liters of water to 3 kg of No. 4 silica sand prescribed by the Civil Engineering Society. A test piece 92 measuring 50×25×3 mm was cut out of an injection-molded, 85 mm diameter disc having a similar width. As illustrated, the test piece 92 was continuously rotated by a motor 93 in the sand slurry for 20 hours at 1,000 rpm. For comparison, a test piece of similar dimensions were formed of carbon tool steel SK-5 and subjected to wear-resistant testing under similar conditions, using silicon carbide as a slurry.

The polyethylene resins used are Hi-Zex 5000H (having a molecular weight of 130,000 and made by Mitsui Petrochemical Industries, Ltd.), SHOLEX-SUPER 4451H (having a molecular weight of 330,000 and made by Showa Denko K.K.), Hi-Zex million 240M (having a molecular weight of 2,200,000 and made by Mitsui Petrochemical Industries, Ltd.) and Hosteren GUR413 (having a molecular weight of 2,900,000 and made by Hoechst).

The molding conditions were a screw's speed of rotation of 180 rpm, a cylinder nozzle zone's temperature of 240° C. and a compression zone's temperature of 170° C., but the feeder zone was cooled off by spontaneous heat radiation. The mold's temperature was fixed at 70° C., and a nitrogen gas was fed into the hopper at a ratio of 1.0 liter/min.

Figure 10:
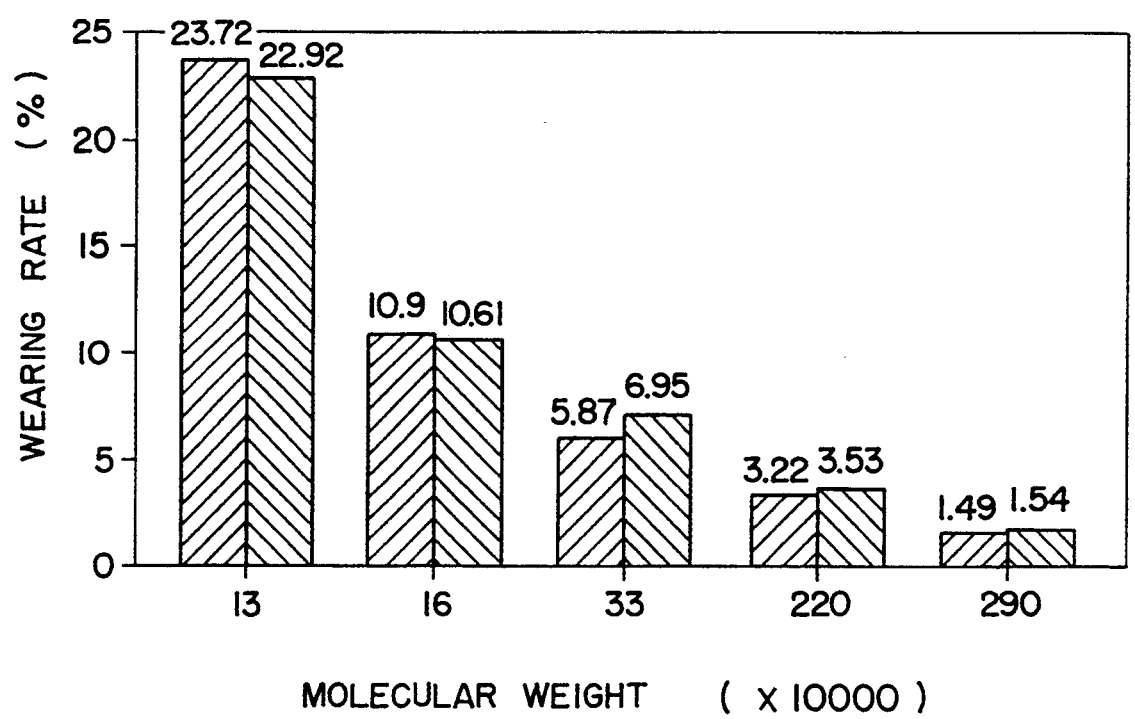
FIG. 10 is a graphical view showing the results of sand slurry testing.
Figure 11:
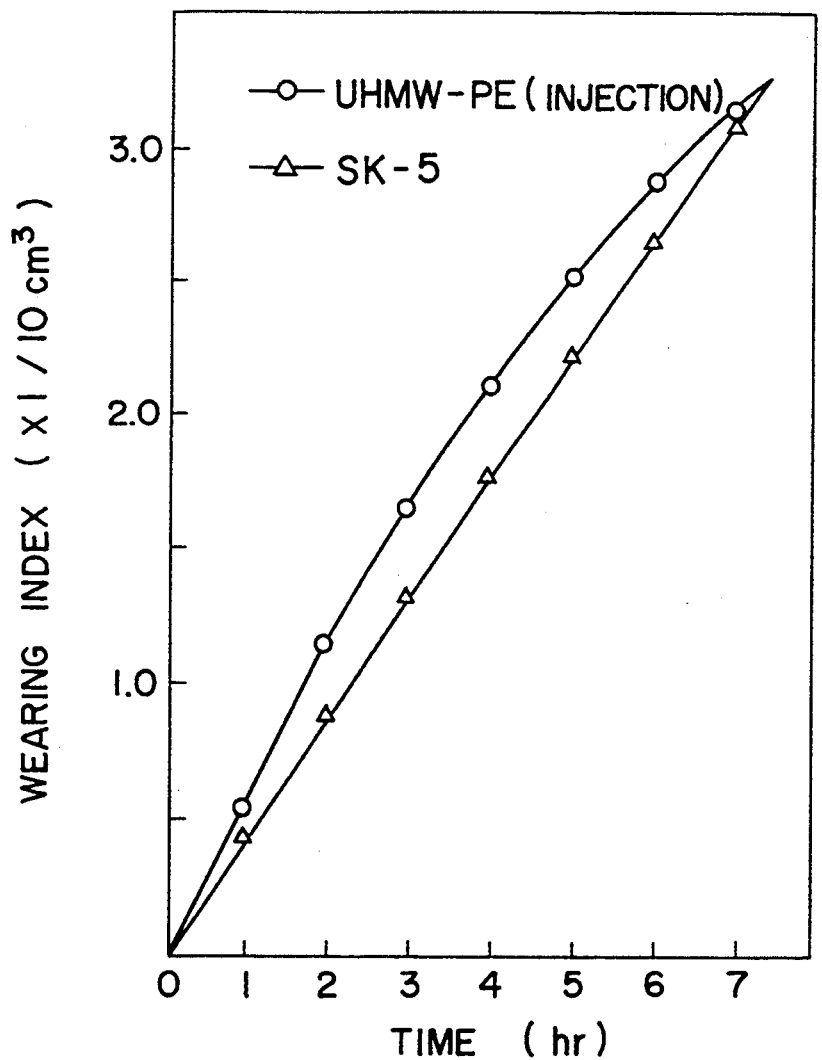
FIG. 11 is a graphical view showing the results of abrasion resistance testing.

The results of wear resistance by the sand slurry testing are set forth in FIG. 10, from which it is found that the higher the molecular weight, the smaller the volume reduction and the less the wearing. The results of a comparison with the carbon tool steel are also set forth in FIG. 11. These results prove that the present molding method is equivalent in terms of the abrasion loss of the ultrahigh-molecular weight polyethylene to conventional compression molding, and is improved in terms of productivity without causing damage to the function of the ultrahigh-molecular weight polyethylene.

The following examples refer to the results of the following resins, formulations and additives investigated.

TABLE 1

(Formulations of Resin Materials)

Resins used:
- (1) Hi-Zex million 240M    (M.W.: 2,900,000)
- (2) Lubmer L5000P          (M.W.: 900,000)
- (3) Lubmer L3000P          (M.W.: 300,000)

Formulations:
- (1) Hi-Zex million 240M alone   (M.W.: 2,900,000)
- (2) 240M:L5000P 3:1             (M.W.: 2,400,000)
- (3) 240M:L5000P 1:1             (M.W.: 1,900,000)
- (4) 240M:L5000P 1:3             (M.W.: 1,400,000)
- (5) Lubmer L500P alone          (M.W.: 900,000)
- (6) L500P:L3000P 1:1            (M.W.: 600,000)
- (7) Lubmer L300P alone          (M.W.: 300,000)

Additives:
- (1) Hydrocarbonaceous additive
    Oil
    (a) Lucant HC-20
    (b) Liquid paraffin
    Low-molecular weight resin (PE wax)
- (2) Silicone base additive
    Silicone oil
    Silicone powders
    Silica beads
- (3) Fluorine base additive
    Fluorine surfactants
    (a) Anionic
    (b) Nonionic
    (c) Cationic
    Fluororesin powders
- (4) Lubricants
    Calcium stearate
    Calcium carbonate
- (5) Carbon
    Carbon black
    (a) Acetylene black
    (b) Kechen black
    Graphite

EXAMPLE 2

The resins shown in Table 1 were mixed together to prepare polyethylene resins having varied molecular weights. Five (5)% by weight of carbon black (acetylene black) were added to the resulting mixtures which were in turn molded with a molding machine similar to that used in Ex. 1 to obtain molded pieces of such a shape as shown in FIG. 1. They were then estimated as tape guides.

The mixing ratios are set out in Table 2-1.

Carbon black was mixed with the resins of 50° C. by dry-blending them together at 1800 rpm and normal temperature over 5 minutes with a Henschel mixer.

The molding conditions were similar to those applied in Ex. 1, i.e., a mold temperature of 70° C., a resin temperature of 240° C. and a screw's speed of rotation of 180 rpm. The molding cycle was 25 seconds and the mold used was of a four-cavity type.

The tape guides molded under the above conditions were loaded in an actual cassette (T-120) according to the VHS specification to measure the take-up time of a tape in fast forward (FF for short) and rewind (REW for short), using a rewinder (KMV-750) made by TAPEX. The larger the dynamic frictional force of the tape guides to a magnetic tape, the longer the time taken will be, and vice versa. By such actual experimentation, damages to the magnetic tape (marring) can also be estimated.

The results are set forth in Table 2-2.

TABLE 2-1

(Blend Examples)

| | | |
|---|---|---|
| (1) Hi-Zex million 240M alone | (M.W.: 2,900,000) |
| (2) 240M:L5000P 3:1 | (M.W.: 2,400,000) |
| (3) 240M:L5000P 1:1 | (M.W.: 1,900,000) |
| (4) 240M:L5000P 1:3 | (M.W.: 1,400,000) |
| (5) Lubmer L500P alone | (M.W.: 900,000) |
| (6) L500P:P3000P 1:1 | (M.W.: 600,000) |
| (7) Lubmer L3000P alone | (M.W.: 300,000) |

TABLE 2-2

(Travelling Time by Rewinder)

| No. | Travelling Time | Tape Marring | Guide Marring |
|---|---|---|---|
| (1) | 5'13 | 37 | 0 |
| (2) | 5'05 | 32 | 0 |
| (3) | 4'38 | 5 | 0 |
| (4) | 4'36 | 4 | 0 |
| (5) | 4'34 | 6 | 0 |
| (6) | 4'35 | 8 | 3 |
| (7) | 4'35 | 9 | 5 |
| Comp. (1) | 4'35 | 5 | 0 |
| Comp. (2) | 4'36 | >100 | 80 |

Note 1: Travelling time an average of ten travelling time values in FF and REW, measured with a TAPEX rewinder.
Note 2: Tape marring - the number of marrings occurring on a tape reciprocated 50 times under a load of 50 g at a speed of 1000 mm/min. over a length of 150 mm.
Note 3: Guide marring - the number of marrings occurring on a guide, as measured by similar procedures as applied in Note 2.
Note 4: Comparative (1) refers to a value of a generally available metallic guide.
Note 5: Comparative (2) refers to a value of a resinous (POM) guide built in a cassette sold by Victor Company of Japan, Ltd.

From the above results, it is desired that the molecular weight be from 800,000 to 2,000,000 inclusive. It has also been found that the guides of the present invention are superior in terms of marring to the comparative resinous guides.

EXAMPLE 3

This example was performed to determine the quantitative range of carbon black added to the ultrahigh-molecular weight polyethylene.

How to blend resins, how to mold tape guides, etc. are similar to those described in Examples 1 and 2.

For estimation, static and dynamic frictional forces applied to magnetic tapes were measured with a tensile tester made by Orientic Co., Ltd. (Tensilon). In other words, the frictional forces applied on a tape, when reciprocated 50 times under a load of 50 g at a speed of 1000 mm/min., were measured with a load cell. The tape used to this end are an HS type T-120 tape made by TDK.

The obtained conclusions are that taking the frictional forces and the number of marrings occurring on the tapes and the sliding surfaces of the tape guides into account, the most preferable amount of acetylene black added is 5% by weight, while the most favorable amount of ketchen black added is in a range of 2 to 5% by weight.

The resins used for estimation are listed up in Table 3-1, and the results of estimation are set forth in Table 3-2.

TABLE 3-1

(Composition)

Carbon Black Used
   a) Acetylene Black
   b) Ketchen Black
Resins Used
   1) 240M:L5000P 1:1   (M.W.: 1,900,000)
   2) 240M:L5000P 1:3   (M.W.: 1,400,000)
   3) Lubmer L500P alone   (M.W.: 900,000)
Combinations of Additives
   (1) 1) Alone
   (2) 2) Alone
   (3) 3) Alone
   (4) 1) with 2 wt % of a) added
   (5) 2) with 2 wt % of a) added
   (6) 3) with 2 wt % of a) added
   (7) 1) with 5 wt % of a) added
   (8) 2) with 5 wt % of a) added
   (9) 3) with 5 wt % of a) added
   (10) 1) with 10 wt % of a) added
   (11) 2) with 10 wt % of a) added
   (12) 3) with 10 wt % of a) added
   (13) 1) with 2 wt % of b) added
   (14) 2) with 2 wt % of b) added
   (15) 3) with 2 wt % of b) added
   (16) 1) with 5 wt % of b) added
   (17) 2) with 5 wt % of b) added
   (18) 3) with 5 wt % of b) added
   (19) 1) with 10 wt % of b) added
   (20) 2) with 10 wt % of b) added
   (21) 3) with 10 wt % of b) added

TABLE 3-2

(Results of frictional forces and marrings found)

| No. | Frictional Loads | Tape Marring | Guide Marring |
|---|---|---|---|
| (1) | 91 | 6 | 0 |
| (2) | 89 | 4 | 0 |
| (3) | 87 | 6 | 0 |
| (4) | 85 | 5 | 0 |
| (5) | 85 | 4 | 0 |
| (6) | 84 | 3 | 0 |
| (7) | 83 | 6 | 0 |
| (8) | 83 | 2 | 0 |
| (9) | 82 | 6 | 0 |
| (10) | 85 | 7 | 0 |
| (11) | 87 | 2 | 0 |
| (12) | 87 | 5 | 0 |
| (13) | 84 | 4 | 1 |
| (14) | 82 | 4 | 0 |
| (15) | 82 | 6 | 0 |
| (16) | 82 | 3 | 1 |
| (17) | 83 | 7 | 0 |
| (18) | 82 | 3 | 1 |
| (19) | 84 | 4 | 2 |
| (20) | 86 | 4 | 0 |
| (21) | 85 | 2 | 0 |
| Comp. (1) | 80 | 30 | 0 |
| Comp. (2) | 81 | <100 | 80 |

Note: Frictional load - a value of the load applied to a video tape, when reciprocated over a guide under a load of 50 g at a speed of 1000 mm/min.

EXAMPLE 4

In order to reduce frictional resistance, investigation was made of additives. The resins used were similar three types as used in Example 3, and 5% by weight of acetylene black were added as carbon black. As was the case with the addition of carbon black, acetylene black was added simultaneously with the mixing of carbon black. Mixing conditions were similar as applied in Ex. 2. Measurement was also carried out in similar manners as used in Ex. 3.

Additives in liquid or powdery form and used in smaller amounts were diluted and mixed with volatile solvents for dissolving them such as ethyl alcohol, methyl alcohol, isopropyl alcohol, methyl ethyl ketone and acetone, followed by the removal of excessive solvents by the application of heating and reduced pressure.

The additives used are shown in Table 4-1 along with their amounts.

TABLE 4-1

(Additive and their quantities)

Additives Used
   (1) Hydrocarbonaceous additive
      Oil
         a) Lucant HC-20
         b) Liquid paraffin
      Low-molecular weight resin (PE wax)
   (2) Silicone base additive
      Silicone oil
      Silicone powders
      Silica beads
   (3) Fluorine base additive
      Fluorine surfactants
         (a) Anionic
         (b) Nonionic
         (c) Cationic
      Fluororesin powders
   (4) Lubricants
      Calcium stearate
      Calcium carbonate Quantities of Additives
| | |
|---|---|
| (1) Lucant HC-20 | 5 wt. % |
| (2) Liquid paraffin | 5 wt. % |
| (3) PE wax | 5 wt. % |
| (4) Silicone oil | 5 wt. % |
| (5) Silicone powders | 5 wt. % |
| (6) Silica beads | 5 wt. % |
| (7) Anionic fluorine base surfactants | 0.1 wt. % |
| (8) Nonionic fluorine base surfactants | 0.1 wt. % |
| (9) Cationic fluorine base surfactants | 0.1 wt. % |
| (10) Fluororesin powders | 30 wt. % |
| (11) Calcium stearate | 2 wt. % |
| (12) Calcium carbonate | 2 wt. % |

The obtained results are set forth in Tables 4-2 to 4-4.

TABLE 4-2

(Results of frictional Results Found (25° C.: TDK HS))

| No. | 1,900,000 | 1,400,000 | 900,000 |
|---|---|---|---|
| (1) | 80 | 80 | 81 |
| (2) | 78 | 79 | 77 |
| (3) | 80 | 81 | 81 |
| (4) | 76 | 76 | 77 |
| (5) | 80 | 81 | 82 |
| (6) | 77 | 78 | 78 |
| (7) | 77 | 77 | 78 |
| (8) | 77 | 78 | 78 |
| (9) | 77 | 79 | 77 |
| (10) | 83 | 83 | 83 |
| (11) | 77 | 78 | 77 |
| (12) | 83 | 82 | 83 |
| (13) | 80 | 80 | 80 |
| Comp. (1) | 83 | 83 | 83 |
| Comp. (2) | 83 | 83 | 83 |

TABLE 4-3

(Results of frictional Results Found (60° C.: TDK HS))

| No. | 1,900,000 | 1,400,000 | 900,000 |
|---|---|---|---|
| (1) | 84 | 83 | 84 |
| (2) | 83 | 83 | 82 |
| (3) | 78 | 79 | 79 |
| (4) | 76 | 76 | 76 |
| (5) | 78 | 78 | 79 |
| (6) | 80 | 81 | 79 |
| (7) | 81 | 80 | 81 |
| (8) | 80 | 81 | 79 |
| (9) | 81 | 81 | 80 |
| (10) | 83 | 82 | 81 |
| (11) | 82 | 81 | 81 |
| (12) | 80 | 80 | 81 |
| (13) | 76 | 76 | 76 |
| Comp. (1) | 75 | 75 | 75 |
| Comp. (2) | 79 | 79 | 79 |

TABLE 4-4

(Results of frictional Results Found (10° C.: TDK HS))

| No. | 1,900,000 | 1,400,000 | 900,000 |
|---|---|---|---|
| (1) | 86 | 85 | 86 |
| (2) | 87 | 86 | 86 |
| (3) | 85 | 85 | 84 |
| (4) | 83 | 83 | 82 |
| (5) | 85 | 86 | 85 |
| (6) | 85 | 85 | 86 |
| (7) | 88 | 88 | 87 |
| (8) | 88 | 88 | 88 |
| (9) | 88 | 87 | 88 |
| (10) | 89 | 90 | 90 |
| (11) | 85 | 85 | 85 |
| (12) | 89 | 90 | 89 |
| (13) | 91 | 90 | 91 |
| Comp. (1) | 85 | 85 | 85 |
| Comp. (2) | 92 | 92 | 92 |

From the above results, it is found that frictional resistance varies depending upon what temperature is used for measurement, and that the types of additives for reducing frictional resistance differ at low or high temperatures. It was only silicone oil (3) that satisfied all the conditions. Saving at low temperatures, the test pieces containing no additive showed relatively good values, but such values dropped at low temperatures.

These data hold for HS grade tapes sold by TDK, and the types of suitable additives vary depending upon the tapes used by various makers and whether or not back coating is applied. For instance, a combination of a fluorine base surfactant with a hydrocarbonaceous oil is most effective for a reduction in the frictional resistance of JVC tapes. That is, it is required to select the additives according to the characteristics of various makers and it is desired that the above additives be used alone or in combination of two or more.

EXAMPLE 5

In this example, the travelling torque, which the tape guides of the present invention exerted on an actual tape deck, was estimated by measuring the output voltage of a deck's motor.

The tape deck used for estimation is a VTR BR-7000A made by JVC. The tape used was an HS type T-120 made by TDK. The resins used and how to add them are similar as described in Example 4. This holds for the molding conditions, molding machine and mold.

The results are set forth in Tables 5-1 to 5-4.

TABLE 5-1

(Results of Torque Found (at the beginning of winding in FF; TDK HS))

| No. | 1,900,000 | 1,400,000 | 900,000 |
|---|---|---|---|
| (1) | 32 | 32 | 32 |
| (2) | 31 | 32 | 31 |
| (3) | 32 | 33 | 32 |
| (4) | 31 | 31 | 31 |
| (5) | 32 | 33 | 32 |
| (6) | 32 | 32 | 32 |
| (7) | 32 | 32 | 32 |
| (8) | 32 | 32 | 32 |
| (9) | 32 | 33 | 32 |
| (10) | 34 | 35 | 34 |
| (11) | 31 | 32 | 31 |
| (12) | 35 | 35 | 35 |
| (13) | 32 | 32 | 32 |
| Comp. (1) | 32 | 32 | 32 |
| Comp. (2) | 35 | 35 | 35 |

Note 1: Torque - a torque (in mV) applied to a motor in FF and REW which was measured at the beginning and end of winding with Victor VTR BR-7000A.

TABLE 5-2

(Results of Torque Found (at the end of winding in FF; TDK HS))

| No. | 1,900,000 | 1,400,000 | 900,000 |
|---|---|---|---|
| (1) | 194 | 192 | 190 |
| (2) | 191 | 190 | 189 |
| (3) | 197 | 198 | 196 |
| (4) | 184 | 185 | 184 |
| (5) | 195 | 195 | 194 |
| (6) | 191 | 190 | 189 |
| (7) | 192 | 194 | 191 |
| (8) | 187 | 188 | 186 |
| (9) | 192 | 192 | 190 |
| (10) | 195 | 193 | 191 |
| (11) | 188 | 187 | 185 |
| (12) | 192 | 191 | 189 |
| (13) | 199 | 197 | 195 |
| Comp. (1) | 184 | 184 | 184 |
| Comp. (2) | 190 | 190 | 190 |

TABLE 5-3

(Results of Torque Found (at the beginning of winding in REW; TDK HS))

| No. | 1,900,000 | 1,400,000 | 900,000 |
|---|---|---|---|
| (1) | 32 | 31 | 32 |
| (2) | 30 | 31 | 30 |
| (3) | 32 | 32 | 31 |
| (4) | 30 | 29 | 30 |
| (5) | 32 | 32 | 31 |
| (6) | 31 | 32 | 32 |
| (7) | 30 | 30 | 30 |
| (8) | 32 | 32 | 32 |
| (9) | 32 | 32 | 32 |
| (10) | 34 | 34 | 33 |
| (11) | 30 | 32 | 31 |
| (12) | 33 | 34 | 33 |
| (13) | 31 | 32 | 32 |

TABLE 5-3-continued (Results of Torque Found (at the beginning of winding in REW; TDK HS))

| No. | 1,900,000 | 1,400,000 | 900,000 |
| --- | --- | --- | --- |
| Comp. (1) | 31 | 31 | 31 |
| Comp. (2) | 33 | 33 | 33 |

TABLE 5-4

(Results of Torque Found (at the end of winding in REW; TDK HS))

| No. | 1,900,000 | 1,400,000 | 900,000 |
| --- | --- | --- | --- |
| (1) | 154 | 152 | 150 |
| (2) | 151 | 150 | 149 |
| (3) | 157 | 155 | 156 |
| (4) | 145 | 144 | 144 |
| (5) | 155 | 155 | 154 |
| (6) | 151 | 150 | 149 |
| (7) | 152 | 154 | 151 |
| (8) | 147 | 148 | 146 |
| (9) | 152 | 152 | 150 |
| (10) | 155 | 153 | 151 |
| (11) | 148 | 147 | 145 |
| (12) | 152 | 151 | 149 |
| (13) | 159 | 157 | 155 |
| Comp. (1) | 144 | 144 | 144 |
| Comp. (2) | 150 | 150 | 150 |

The conclusions obtained from the above results are that torque is higher at the end of winding than at the beginning of winding and is higher and much more varied in FF than in REW. In the case of HS tapes made by TDK, the best results are obtained with silicone oil (3).

At the beginning of winding, the tape travels at a slow speed with limited friction, but the results of torque coincide substantially in both FF and REW with the results of frictional resistance obtained in Ex. 4.

In order to reduce torque at the beginning of winding, additives such as those capable of reducing frictional resistance may be selected. In order to reduce torque at the end of winding, however, it may be required to take changes in the shape of tape guides per se such as limiting their eccentricity into consideration.

Industrial Applicability

The sliding members of the present invention are widely applicable as guides for magnetic tapes such as video and cassette tapes.

We claim:

1. A method for producing a sliding member comprising a polyethylene having a viscosity-average molecular weight of 500,000 to 6,000,000 inclusive, having a low coefficient of friction and excelling in both its own wear resistance and its property of preventing the abrasion of an associated member by injection molding, which comprises the steps of:

preparing a composite material by dry-blending:
(i) an ultra-high molecular weight polyethylene resin powder having a viscosity-average molecular weight of 1,000,000 to 6,000,000 inclusive,
(ii) a high molecular weight polyethylene resin powder having a viscosity-average molecular weight of 300,000 to 1,000,000 inclusive, and
(iii) an additive comprising an organic or inorganic material at a temperature up to the melting point of said resin powders (i) and (ii), in the presence of stirring acceleration, thereby depositing said additive onto only the surface of said polyethylene resin powder particles to obtain the composite material;

introducing said composite material into an injection cylinder in a non-oxidizing atmosphere in which said composite material is melted within a short time by fixing the compression ratio of a screw of said injection cylinder at 1.3 to 2.0 and regulating the length to diameter ratio of the screw to from 15 to 20;

vacuumizing a mold cavity portion;

injecting the melted composite material into said mold cavity prior to the initiation of thermal crosslinking; and compressing the injected melted composite material by reducing a space of said cavity prior to solidifying said composite material, thereby obtaining said sliding member.

2. A method as claimed in claim 1, wherein the viscosity-average molecular weight of said polyethylene is in a range of 500,000 to 2,000,000 inclusive.

3. A method as claimed in claim 1, wherein said sliding member is a guide for aiding the travelling of a tape, sheet or film.

4. A method as claimed in claim 1, wherein said sliding member is a guide for magnetic tapes.

5. A method as claimed in claim 1, wherein said additive comprises a hydrocarbonaceous oligomer.

6. A method as claimed in claim 1, wherein said additive comprises a fluorine base surfactant.

7. A method as claimed in claim 1, wherein said additive comprises a fine powder of tetrafluoroethylene.

8. The method as claimed in claim 1, wherein said additive is an electrically conductive material.

9. The method as claimed in claim 8, wherein said electrically conductive material is added in an amount of from 0.1 to 20% by weight.

10. The method as claimed in claim 5, wherein said hydrocarbonaceous oligomer is added in an amount of from 0.1 to 20% by weight.

11. The method as claimed in claim 6, wherein said fluorine base surfactant is added in an amount of from 0.1 to 5% by weight.

12. The method as claimed in claim 1, wherein said additive comprises a fluororesin powder.

13. The method as claimed in claim 12, wherein said fluororesin powder is added in an amount of from 0.1 to 50% by weight.

14. The method as claimed in claim 1, wherein said additive comprises two or more organic materials.

15. The method as claimed in claim 1, wherein said additive comprises a ceramic material.

16. The method as claimed in claim 1, wherein said ceramic material is added in an amount of from 0.1 to 20% by weight.

17. The method as claimed in claim 1, wherein the particle size of said polyethylene resins (i) and (ii) is from 10 to 300 μm.

18. The method as claimed in claim 1, wherein the particle size of said additive is from 0.01 to 100 μm.

19. The method as claimed in claim 1, wherein said temperature of said dry-blending step is from 60° to 90° C.

20. The method as claimed in claim 1, wherein said ultra-high molecular weight polyethylene resin powder has a viscosity-average molecular weight of at least 2,000,000.

21. The method as claimed in claim 1, wherein said high molecular weight polyethylene resin powder has a viscosity-average molecular weight of from 300,000 to 950,000, inclusive.

* * * * *